Oct. 18, 1960  W. A. NIEMANN  2,956,386
LAWN MOWER
Filed Oct. 19, 1956  2 Sheets-Sheet 1

INVENTOR.
Walter A. Niemann
BY
Soans, Anderson, Luedeka
& Fitch
Attys.

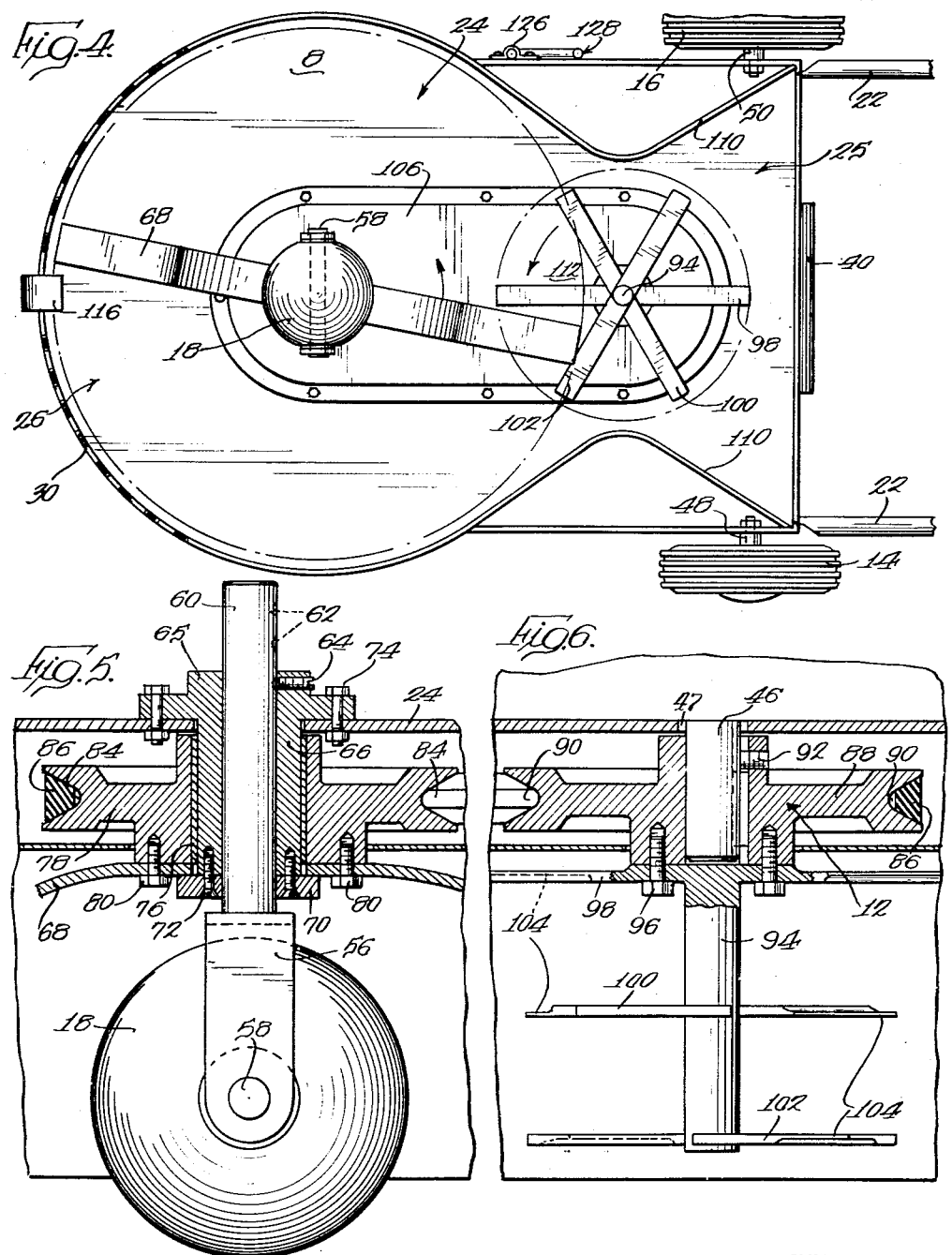

United States Patent Office 2,956,386
Patented Oct. 18, 1960

2,956,386

LAWN MOWER

Walter A. Niemann, Chicago, Ill.
(P.O. Box 27, Powers, Mich.)

Filed Oct. 19, 1956, Ser. No. 617,090

6 Claims. (Cl. 56—25.4)

The present invention relates generally to cutting and mulching means, and is more particularly related to an apparatus for simultaneously cutting and mulching vegetation and the like.

Various types of apparatus have been constructed for the purpose of mowing or cutting grass and other types of vegetation, and some of the types of such apparatus are power driven. In addition, apparatus has been constructed for mulching grass, leaves and the like to finely divided form, the mulched material then being returned to the soil, as desired, for use as a fertilizer or compost.

Several types of conventional power lawn mowers are now equipped with associated and removable mulching equipment. In general, the mulching equipment attached to lawn mowers usually comprises a series of baffles or stationary grids for the purpose of directing grass, leaves, etc. cut by the cutting blade of the mower back into contact with the cutting blade for recutting to a finely comminuted form. Rotary mowers employing stationary grids or mesh screens as mulching equipment usually locate these grids at the rear portion of the cutting enclosure. In other words, the vegetation is initially cut by the mower blade and is then forced to recirculate within the cutting enclosure until small enough to pass through the apertures in the grid.

Certain difficulties are encountered when mulching apparatus of the above described type is utilized as an integral part of power lawn mowers. When grid type mulchers are employed, the apertures in the grid are subject to plugging with cut vegetation. Once the apertures in the grid become plugged, the cutting enclosure of the mower may quickly fill with cut vegetation and cause overloading of the mower motor. This necessitates stopping the mower and cleaning out the enclosure and mulching grid before resuming the mowing and mulching operations. Such plugging frequently occurs where dense or wet grass or other vegetation is being cut. Consequently, operators of power mowers having detachable mulching grids and the like frequently remove the mulching equipment from the power mowers except when areas are cut which have sparse and/or relatively short vegetation. Where types of mulching equipment other then mulching grids are utilized, the quality of mulching obtained is often poor, that is, the vegetation is not readily reduced to the finely comminuted form desired, and recutting of the previously mulched area is required to achieve the desired effects.

It has now been discovered that efficient, high quality mowing and mulching can be carried out simultaneously through the use of a single apparatus. This apparatus is effective even though utilized in areas having dense and/or wet vegetation.

Accordingly, it is the primary object of this invention to provide an improved combined mowing and mulching apparatus. It is also an object of this invention to provide an improved mower having integral co-operating mowing and mulching assemblies. It is a further object of this invention to provide an improved power mower which simultaneously, and at high speed, efficiently mows and mulches vegetation to a finely comminuted form. Further objects of this invention will be apparent from the following detailed description and the accompanying drawings of which:

Figure 4 is a bottom view of the embodiment shown in Figure 1;

Figure 5 is an enlarged, fragmentary view, partially in section, taken along the section line 5—5 of Figure 1; and Figure 6 is an enlarged, fragmentary view, partially in section, taken along the section 6—6 of Figure 1.

Figure 1:
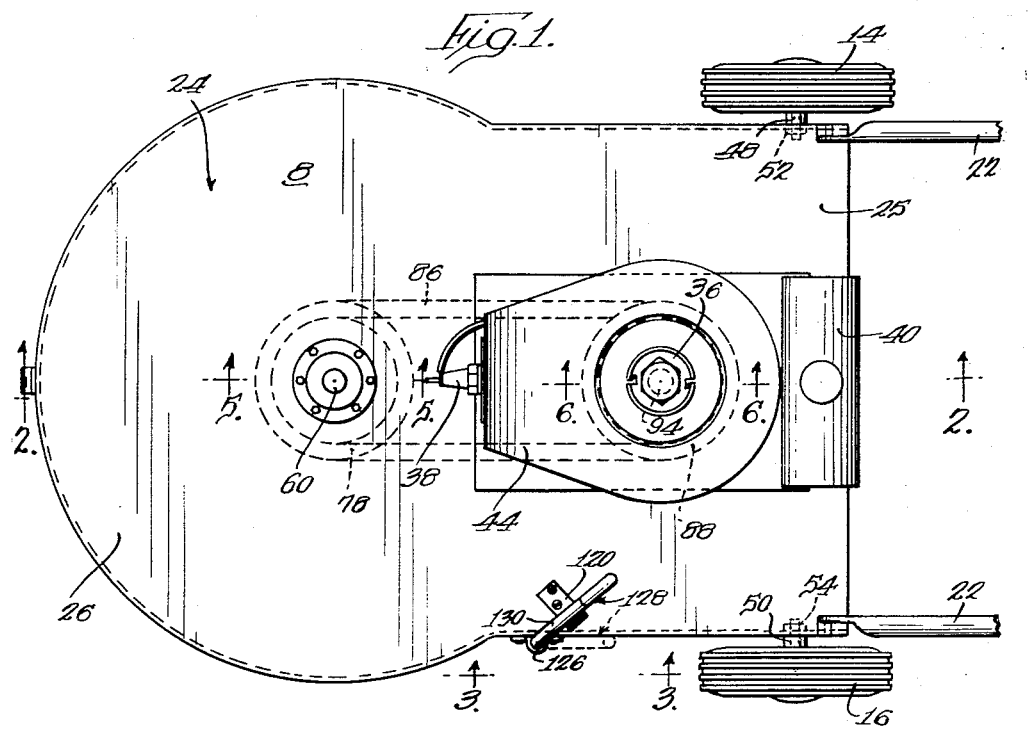
Figure 1 is a plan view of a mower embodying the features of the present invention.
Figure 2:
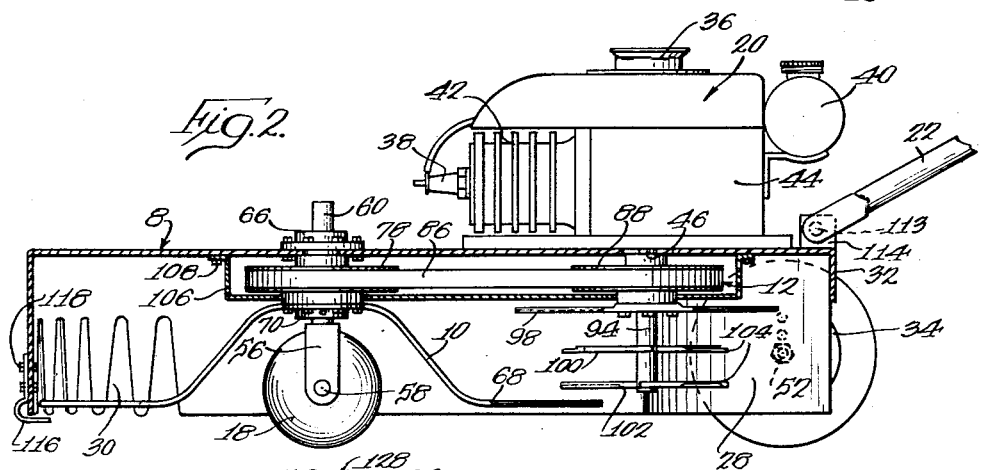
Figure 2 is a sectional view, taken along the section line 2—2 of Figure 1.

Referring now more particularly to the accompanying drawings, the mower of the present invention, as shown in Figures 1 through 6, inclusive, includes a housing 8, a cutting bar 10, a mulching blade assembly 12, rear wheels 14 and 16, and front wheel 18. Rear wheels 14 and 16, and front wheel 18 support the cutting bar 10 and mulching assembly 12 in their respective cutting and mulching positions. The mower also includes a motor 20 and means 22 for guiding the mower over vegetation to be mowed and mulched.

The housing 8 comprises a generally circular top plate 24 having a generally rectangular narrowed rear portion 25 and an arcuately shaped expanded front portion 26. Depending from top plate 24 and terminating a short distance above the ground are sides 28 which, as shown, are integral with top plate 24. Sides 28 follow the contour of the top plate 24. Sides 28 are provided at the forward portion thereof with tooth-shaped apertures 30 to facilitate entry of vegetation to the area defined by housing 8. Also depending from top plate 24, integral therewith and terminating a short distance above the ground, is a rear plate 32. Rear plate 32 is provided with a suitable large aperture 34 from which exits mulched vegetation. If desired, rear plate 32 may be dispensed with so that aperture 34 extends over the entire area usually occupied by both plate 32 and aperture 34. Sides 28 co-operate with top plate 24 to define an arcuately-shaped cutting area beneath portion 26 of housing 8. Sides 28-co-operate with the top plate 24 and the rear plate 32 to define a generally rectangular mulching area beneath portion 25 of housing 8. Housing 8 and its component parts may be constructed of any suitable sheet material, but is preferably made of steel of sufficient gauge and strength to support the motor 20 and the associated cutting and mulching equipment for extended use.

The motor 20 may comprise an electric motor, an internal combustion engine, or similar power means. For purposes of illustration, the motor 20 of the embodiment shown in Figures 1 to 6, inclusive, is shown as an internal combustion engine, including a flywheel 36, spark plug 38, fuel supply tank 40, and air vents 42 in casting 44. The motor 20 is mounted on the rear portion 25 of top plate 24 by any suitable means, as by spot welding, riveting, bolting or the like. The motor 20 actuates a drive shaft 46 (Figures 2 and 6) which extends downwardly from the motor through an aperture 47 in plate 24 for connection with the mulching blade assembly 12.

Rear wheels 14 and 16 are preferably of the pneumatic type and are connected to housing 8 by means of pins 48 and 50 extending through suitably tapped apertures in the rearward portion of sides 28. Wheels 14 and 16 are held in operative position by means of lock nuts 52 and 54. A series of vertically spaced apertures are provided through sides 28 for the reception of pins 48 and 50 so that the height of the mower from the ground can be adjusted.

Front wheel 18 is centrally disposed with respect to the sides 28 of the housing 8 and is connected to and depends from plate 24. Wheel 18 may be of any suitable size, shape and construction, but is preferably spherical. In the illustrated embodiment, the wheel 18 is mounted for universal movement in a yoke 56 by means of an axle 58 (Figure 5). Yoke 56 is, in turn, connected to permit rotation about a vertical axis, as by welding or the like, to a vertical rod 60 which extends up through an aperture in plate 24.

In the upper portion of rod 60 above the level of plate 24 are disposed a series of recesses 62 for the purpose of adjusting the height of housing 8 with respect to wheel 18. The adjustment is made in conjunction with the above-described adjustment of the rear portion of housing 8 with respect to wheels 14 and 18. Housing 8 can be raised or lowered with respect to wheel 18 by set screw 64. Screw 64 is threaded through a shoulder 65 located on the upper surface of the flanged section of bushing 66, and is received in a recess 62 in the rod 60.

Bushing 66 receives rod 60. Bushing 66 comprises a lower section which extends through an aperture in plate 24 and a flanged section which is bolted to plate 24 by means of bolts 74. Bushing 66 is dimensioned to fit into the aperture in plate 24 and to abut plate 24, as shown particularly in Figure 5.

Cutting bar 10 may be substantially bell-shaped (Figure 2) and has two arms with leading edges 68 which are sharpened for efficient cutting of vegetation. Cutting bar 10 may be fabricated from any suitable metal, preferably hardened steel. The cutting bar 10 is releasably supported and positioned around bushing 66 by a washer 70. Washer 70 is in turn secured to bushing 66 by means of recessed screws 72 which extend up through washer 70 and into the lower portion of bushing 66.

Journaled, press fitted to, and encompassing the major part of the lower section of bushing 66 is a wear resistant sleeve bearing 76, preferably fabricated from bronze or other suitable material. Bearing 76 is, in turn, fixedly connected, as by spot welding, or similar means, to a generally horizontally extending driven sheave 78 which surrounds bearing 76. Cutting bar 10 is bolted to the underside of the sheave 78 by means of bolts 80. Sheave 78 has a groove 84 for receiving a V-belt 86 which connects the sheave with a power source. The cutting assembly, therefore, comprises the cutting bar 10, the washer 70, the bushing 66, the sleeve bearing 76 and the sheave 78. In the embodiment of Figures 1 to 6, inclusive, sheave 78 is linked to the power source by means of the V-belt 86 which connects to assembly 12.

Wheel 18 is centrally positioned relative to cutting bar 10, the cutting bar in operation rotating around the wheel. The assembly 12, shown in detail in Figure 6, is directly connected to the drive shaft 46 of the motor 20 and comprises a sheave 88 and associated parts. Assembly 12 is located rearwardly of the cutting bar 10 and its associated parts, and is arranged to co-operate and co-act with cutting bar 10, for efficient cutting and mulching.

Sheave 88 has a groove 90 for receiving the V-belt 86. Sheave 88 is fixedly connected to the shaft 46 by means of lock screw 92. To the bottom portion of sheave 88 is connected a vertically extending shaft 94 which is coaxial with the drive shaft 46. The shaft 94 is attached to the sheave 88 by bolts 96 extending through the horizontally extending cutting blade 98 which in turn is connected to the shaft 94 at the upper end thereof.

Aligned at intervals along shaft 94 are other horizontally extending cutting blades, 100 and 102 having opposed edges 104 ground to a fine edge for mulching vegetation. Blade 98 also has a ground cutting edge 104. The blades 98, 100 and 102 may be integral with shaft 94 or may be separate and detachable therefrom. These blades are preferably fabricated from hardened steel so that edges 104 retain their sharpened condition during extended use. Blades 100 and 102 may be arranged in any suitable configuration with respect to each other and with respect to blade 98.

It will be noted that cutting bar 100 and cutting blades 98, 100 and 102 are suitably relatively positioned so that the areas swept by them overlap to an appreciable extent. The region of overlap is generally designated 112 in Figure 4. Preferably, the overlap occurs through an arc of between about 45° and about 120° with respect to the circle described by 98, 100 and 102. Because of this overlap, blades 98, 100 and 102, and bar 10 are disposed on different planes.

Enclosing sheaves 78 and 88 and associated apparatus, but not enclosing blades 98, 100 and 102 and cutting bar 10, is a casing 106 connected to the underside of top plate 24 of housing 8 by means of bolts 108 or other suitable means. The bottom portions of the sheaves 78 and 88 extend down through suitably proportioned apertures in the casing 106. Casing 106 prevents vegetation, dirt and the like from interfering with the efficient operation of the power transmitting means, including the sheaves 78 and 88, the V-belt 86 and associated equipment. Casing 106 is preferably constructed of sheet metal.

Arcuately shaped baffle plates 110 are also provided within housing 8 and are fixedly connected to the inner surfaces of sides 28 by any suitable means, such as spot welding, riveting and the like. Plates 110 are designed to direct the flow of vegetation from the forward cutting area to the rearward mulching area of the mower and into contact with the mulching blades 98, 100 and 102. The baffles also provide for shunting mulched vegetation from the blades 98, 100 and 102 to aperture 34 for passage thereof from housing 8. Accordingly, plates 110 are shaped so as to converge rearwardly to a point approximately opposite the mid-portion of the radius of sweep of blades 98, 100 and 102 and thence to diverge rearwardly so as to meet sides 28 at approximately their rearward point of termination. The plates 110 are preferably constructed of sheet metal.

Push bar 22 is provided for manually guiding the mower over the areas to be cut and mulched and is connected to housing 8 by means of pins 113 inserted through the end of bar 22 and through suitably tapped apertures in flange 114 on the housing. Flange 114 is connected with the housing 8 at the rear end thereof.

Housing 8 is provided with a front guard 116 to protect the cutting bar 10 from damage by large stones and other hard objects over which the mower may otherwise pass. Guard 116 should be fabricated from spring steel, and may be of any of several shapes, as for example, the L-shape shown in Figure 2. One arm of the guard is connected to sides 28, as by bolts 118, and the other arm extends rearwardly beneath the sides 28 and under the cutting blade 10.

Figure 3:
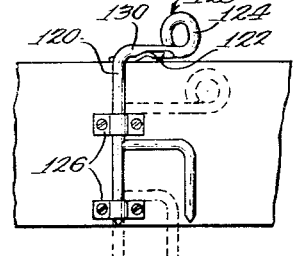
Figure 3 is an enlarged fragmentary view of a safety mechanism, taken along the line 3—3 of Figure 1.

Safety means 120 is provided to hold the mower in a fixed position, and is particularly useful in preventing accidents when starting the mower. As shown in detail in Figures 1 and 3, the safety means 120 includes a spring retainer clip 122 suitably connected to the housing 8. Clip 122 is formed to receive a ground engaging element 124 and to hold the element 124 in an inoperative position during mowing. The ground engaging element 124 is generally h-shaped and pointed. Element 124 is slidably received in brackets 126 on the sides 28 and is provided with a handle portion 128. The handle portion 128 includes a horizontally extending bar 130 connected to the upper end of the h-shaped, ground engaging element. In Figure 3, safety device 120 is shown in the stored unused position, i.e., in engagement with the clip 122. When it is desired to use the safety means 120, the bar 130 is released from the clip 122 and the ground engaging element 124 is rotated so that the bar 130 is not superposed over the housing. The spiked ground engaging element 124 may be forced into the ground by stepping on the horizontal section of the h-shaped element. Safety means 120 may be returned to the stored position by pulling up on handle 128. Bar 130 may then be swung so that it is in the position shown in Figure 3.

In the embodiment of Figures 1 to 6, inclusive, the motor 20 drives the sheave 88 through connection with the vertically extending shaft 46. Rotation of sheave 88 causes rotation of blades 98, 100 and 102, by direct connection therewith through shaft 94, as has been pointed out. Rotation of sheave 88 also causes rotation of sheave 78 by means of V-belt 86, which results in actuation of the cutting bar 10.

It will be seen that in the area 112, blades 98, 100 and 102 move in the opposite direction to cutting bar 10. This results in a much more effective mulching action than heretofore obtainable. The arrangement of apparatus, as above-described, affords improved cutting and mulching of vegetation. The construction of the mulching assembly 12 is such that should the mulching operation not be desired, mulching blades 98, 100 and 102 can be disconnected from sheave 88 by releasing bolts 96 and removing shaft 94, or by removing blades 98, 100 and 102 from shaft 94, if detachable. In either event, the power transfer assembly, including sheave 88, is left intact for transmission of power of rotation to bar 10.

In operation, the mower of the present invention is started by rotating flywheel 36. Before starting the motor 20, safety device 120 may be placed in its operative position, as above-described. When the motor 20 is operating under its own power and shaft 46 is rotating about its vertical axis, the power from motor 20 is transmitted directly from shaft 46 to sheave 88 and blades 98, 100 and 102, and through V-belt 86 to the sheave 78 and the cutting bar 10. If the safety means is being utilized, it is then moved to its inoperative stored position, as above-described.

The mower is then pushed or pulled, preferably pushed, by means of bar 22 over, and into contact with, the vegetation to be cut and mulched. The vegetation enters housing 8 through slots 30 and, due to the action of the cutting bar 10, is straightened and then cut. As the vegetation is cut with the bar 10, baffles 110 guide it into contact with the roating blades 98, 100 and 102 which further comminute it into finely divided form by co-action with bar 10, particularly in the area 112. The comminuted vegetation is then passed, with the aid of baffles 110, rearwardly and out of housing 8 through aperture 34. The action of the bar 10 during rotation and the air currents set up during rotation of blades 98, 100 and 102, keep the vegetation from settling to the ground below the mower before it is finely mulched.

The improved performance of the mower of the present invention is due in large part to the presence of the power driven mulching assembly 12 and to the overlap area 112 between cutting bar 10 and cutting blades 98, 100 and 102. Vegetation, even though dense and high, can be easily and quickly cut and mulched with the mower of the present invention.

Suitable modifications of the component parts of the apparatus of the present invention are contemplated. For example, the position of the motor 20 may be changed so that it directly actuates shaft 60 rather than shaft 94. It will be understood that such a rearrangement of parts would necessitate suitable modifications of structure within the skill of those versed in the art.

Various other modifications of structure as are within the skill of those versed in the art are contemplated as being within the scope of the present invention.

What I claim is the following:

1. An improved vegetation cutting and mulching machine comprising, in combination, a housing having a generally horizontal top, generally vertically depending annular side walls a rear plate, and open bottom; a prime mover mounted on the top of said housing and having a generally vertical drive shaft depending down through said housing; a pair of wheels mounted in the side walls of said housing and disposed near the rear thereof; a third wheel centrally disposed with respect to said side walls beneath said housing; a cutting assembly including a vertical first shaft extending up through said housing and fixedly connected thereto, said shaft supporting said third wheel, a cutting bar horizontally disposed beneath said housing, positioned for cutting and rotatably mounted on said first shaft, and means connecting said bar to said prime mover for rotation of said bar; and, a mulching assembly being disposed rearwardly of said cutting assembly in position to receive vegetation from said cutting assembly, said mulching assembly including at least one horizontally extending blade, a generally vertically extending second shaft below the top of said housing supporting said blade for rotation, means connecting said second shaft to said drive shaft of said prime mover for rotation of said blade thereby positively driving said mulching assembly, said blade and said bar being rotated in the same direction, and said blade and said bar being adapted to sweep areas which overlap.

2. An improved vegetation cutting and mulching machine comprising, in combination: a housing having a generally horizontal top, with an aperture therein, generally vertically depending annular side walls, and an open rear and bottom; a prime mover mounted on the top of said housing and having a generally vertical, rotatable drive shaft depending down through said aperture in said housing; a pair of wheels connected to the side walls of said housing near the rear thereof; a third wheel generally centrally disposed with respect to said side walls and beneath said housing; a cutting assembly including a vertically extending first shaft extending up through said housing and fixedly connected thereto, said shaft supporting said third wheel, a cutting bar horizontally disposed beneath said housing, said bar being positioned for cutting and being rotatably mounted on said first shaft, and a first sheave means fixedly connected to said cutting bar for transmitting power of rotation to said cutting bar; and, a mulching assembly being disposed rearwardly of said cutting assembly in position to receive vegetation from said cutting assembly, said mulching assembly including a plurality of horizontally extending blades, a generally vertically extending rotatable second shaft supporting said blades, a second sheave means fixedly connected to said second shaft, said sheave means also being fixedly connected to said drive shaft of said prime mover, and a belt connecting said second sheave means to said first sheave means to transmit power of rotation to said first sheave means thereby positively driving said mulching assembly, said blades and said bar being rotated simultaneously in the same direction, said blades and said bar being adapted to sweep during rotation areas which overlap.

3. An improved mowing machine comprising, in combination: a housing having a generally horizontal top, vertically depending annular side walls connected to said top to define a forward arcuately shaped cutting area and a rearward mulching area, and an open rear and bottom; a prime mover mounted on the top of said housing near the rear thereof, and having a generally vertical rotatable drive shaft depending downwardly, the top of said housing having an aperture therein through which said shaft extends; a pair of wheels connected to the side walls of said housing near the rear thereof; a third wheel generally centrally disposed within said cutting area beneath the top of said housing; baffle means connected to the inner surfaces of said side walls to direct the flow of cut vegetation from said cutting area within said housing to said mulching area within said housing; a cutting assembly including a vertical first shaft extending up through said housing and fixedly connected thereto, said shaft supporting said third wheel, horizontally disposed cutting bar positioned for cutting below said top of said housing and over said third wheel, said bar being rotatably mounted on said vertical first shaft, and a first sheave means fixedly connected to said cutting bar and rotatably mounted above said cutting bar on said vertical first shaft for transmitting power of rotation to said bar; and, a mulching assembly being disposed rearwardly of said cutting assembly in position to receive vegetation from said cutting assembly, said mulching assembly including a plurality of horizontally extending mulching blades, a rotatable, vertical second shaft supporting said blades, a second sheave means fixedly connected to said second shaft, said second sheave means also being fixedly connected to said drive shaft of said prime mover, and a belt connecting said second sheave means to said first sheave means to transmit power of rotation to said first sheave means thereby positively driving said mulching assembly, said blades and said cutting bar being rotated simultaneously and in the same direction, said blades and said bar being adapted to sweep areas during rotation which overlap.

4. In a vegetation cutting and mulching machine, a horizontally disposed cutting bar rotatable in a horizontal plane and positioned for cutting a path of vegetation, at least one horizontally disposed mulching blade rotatable in a horizontal plane spaced vertically above the plane of rotation of said cutting bar, the axis of rotation of said mulching blade being spaced rearwardly of the axis of rotation of said cutting bar, the axes of rotation of said blade and said bar being substantially aligned along the path of travel of the machine, said mulching blade being of such length as to sweep an overlapping area which is rearwardly of the axis of rotation of said cutting bar and to sweep an area rearwardly of the area swept by said cutting bar, the sweep area of said mulching blade being intermediate the longitudinal edges of the path cut by said cutting blades, whereby the vegetation cut by said cutting bar is delivered to said mulching blade, and driving means operatively connected to said cutting bar and to said mulching blade for positively rotating said cutting bar and mulching blade in the same direction.

5. In a vegetation cutting and mulching machine, a horizontally disposed cutting bar position for cutting a path of vegetation, a generally vertically extending member supporting said cutting bar for rotation in a horizontal plane, at least one horizontally extending mulching blade, a vertically extending shaft supporting said mulching blade for rotation in a horizontal plane that is spaced vertically above the plane of rotation of said cutting bar, said shaft being spaced rearwardly of said member, said shaft and said member being substantially aligned along the path of travel of the machine, said mulching blade sweeping an overlapping area which is rearwardly of the axis of rotation of said cutting bar, and sweeping an area rearwardly of the area swept by said cutting bar, the sweep area of said mulching blade being intermediate the longitudinal edges of the path cut by said cutting blades, whereby the vegetation cut by said cutting bar is delivered to said mulching blade, and driving means operatively connected to said member and to said shaft for positively rotating said cutting bar and said mulching blade in the same direction.

6. In a vegetation cutting and mulching machine, a generally horizontally disposed cutting bar positioned for cutting, a generally vertically extending member supporting said cutting bar for rotation in a horizontal plane, a first sheave means rotatably mounted on said member and fixedly connected to said cutting bar, a plurality of vertically spaced, generally horizontally extending mulching blades, a generally vertically extending rotatable shaft fixedly connected to said mulching blades for rotating said blades in horizontal planes spaced vertically above the plane of rotation of said cutting bar, a second sheave means fixedly connected to said shaft, said shaft being spaced rearwardly of said member a distance such that the mulching blades sweep an overlapping area which is rearwardly of said member and sweep an area rearwardly of the area swept by said cutting bar, whereby the vegetation cut by said cutting bar is delivered to said mulching blades, a belt connecting said second sheave means to said first sheave means for positively rotating said cutting bar and said mulching blades simultaneously in the same direction, a drive shaft fixedly connected to said second sheave means, and a prime mover connected in driving relation to said drive shaft.

References Cited in the file of this patent

UNITED STATES PATENTS

| | | |
|---|---|---|
| 1,622,611 | Sera | Mar. 29, 1927 |
| 2,193,712 | Campbell | Mar. 12, 1940 |
| 2,194,617 | Scott | Mar. 26, 1940 |
| 2,229,363 | Bishop | Jan. 21, 1941 |
| 2,245,821 | Poynter | June 17, 1941 |
| 2,488,140 | Phillips et al. | Nov. 15, 1949 |
| 2,539,934 | Smith et al. | Jan. 30, 1951 |
| 2,621,457 | Rosenberg | Dec. 16, 1952 |
| 2,641,100 | Sylvester | June 9, 1953 |
| 2,661,584 | Ronning | Dec. 8, 1953 |
| 2,690,040 | Miller et al. | Sept. 28, 1954 |
| 2,725,702 | Ross | Dec. 6, 1955 |
| 2,732,675 | Smith et al. | Jan. 31, 1956 |
| 2,734,327 | Whitney | Feb. 14, 1956 |
| 2,751,028 | Laughlin | June 19, 1956 |